(12) United States Patent
Guillem Picó

(10) Patent No.: US 12,151,248 B2
(45) Date of Patent: Nov. 26, 2024

(54) EQUIPMENT FOR SEPARATING BAGGED WASTE

(71) Applicant: THERECIRCULARS S.L., Alicante (ES)

(72) Inventor: Ignacio Guillem Picó, Ibi (ES)

(73) Assignee: THERECIRCULARS S.L., Alicante (ES)

(*) Notice: Subject to any disclaimer, the term of this patent is extended or adjusted under 35 U.S.C. 154(b) by 0 days.

(21) Appl. No.: 18/275,656

(22) PCT Filed: Feb. 24, 2022

(86) PCT No.: PCT/ES2022/070099
§ 371 (c)(1),
(2) Date: Aug. 3, 2023

(87) PCT Pub. No.: WO2022/180291
PCT Pub. Date: Sep. 1, 2022

(65) Prior Publication Data
US 2024/0100541 A1    Mar. 28, 2024

(30) Foreign Application Priority Data
Feb. 25, 2021    (ES) .............................. ES202130393U

(51) Int. Cl.
*B03B 9/06* (2006.01)
*B03B 4/02* (2006.01)
(Continued)

(52) U.S. Cl.
CPC .................. *B03B 9/06* (2013.01); *B03B 4/02* (2013.01); *B07C 5/3412* (2013.01); *B07C 5/3422* (2013.01)

(58) Field of Classification Search
CPC ........... B03B 4/02; B03B 9/06; B07C 5/3412; B07C 5/3422
(Continued)

(56) References Cited

U.S. PATENT DOCUMENTS

| 5,628,412 A * | 5/1997 | Hulls ........................ B65F 3/00 |
| | | 209/930 |
| 6,199,702 B1 * | 3/2001 | Buer ....................... B03B 9/061 |
| | | 209/930 |

(Continued)

FOREIGN PATENT DOCUMENTS

| CN | 108723065 A * | 11/2018 | |
| EP | 1023944 A1 * | 8/2000 | ............... B03B 9/06 |

(Continued)

OTHER PUBLICATIONS

International Search Report of PCT/ES2022/070099, mailed May 5, 2022.

*Primary Examiner* — Terrell H Matthews
(74) *Attorney, Agent, or Firm* — Collard & Roe, P.C.

(57) ABSTRACT

An item of equipment for separating bagged waste has a hopper, separation means for separating the waste, a scanner for classifying the waste, elements for opening the bagged waste, chutes with gates, classification means, an artificial vision camera, and a plurality of shredders. Thus, the shredders are able to shred the waste subsequent to the classification thereof by type of polymer and color, thanks to the artificial vision camera. The equipment enables the individual separation of the bagged waste for the subsequent treatment thereof, as frequently some bags of waste are adhered to others.

18 Claims, 6 Drawing Sheets

(51) Int. Cl.
*B07C 5/34* (2006.01)
*B07C 5/342* (2006.01)

(58) Field of Classification Search
USPC .............................................................. 209/3
See application file for complete search history.

(56) References Cited

U.S. PATENT DOCUMENTS

| | | | |
|---|---|---|---|
| 2008/0098780 A1* | 5/2008 | Shubin | B01F 27/922 |
| | | | 435/290.2 |
| 2013/0119575 A1* | 5/2013 | Whaley | B02C 18/146 |
| | | | 241/98 |
| 2015/0273528 A1 | 10/2015 | Sukkar | |
| 2017/0182500 A1* | 6/2017 | Tamir | C12M 47/10 |
| 2019/0217342 A1* | 7/2019 | Parr | B07C 5/36 |

FOREIGN PATENT DOCUMENTS

| | | | | |
|---|---|---|---|---|
| EP | 4299183 A1 * | 1/2024 | ............. | B03B 4/02 |
| ES | 2 730 380 A1 | 11/2019 | | |
| ES | 2730380 B2 * | 7/2020 | ............. | B03B 9/06 |
| ES | 1 254 512 U | 10/2020 | | |
| JP | 2001225017 A * | 8/2001 | | |
| JP | 2016185541 A * | 10/2016 | ............. | B03B 9/06 |
| WO | WO-2013166830 A1 * | 11/2013 | ............. | B03B 7/00 |
| WO | WO-2014170517 A1 * | 10/2014 | ............ | B03B 9/062 |

* cited by examiner

EQUIPMENT FOR SEPARATING BAGGED WASTE

CROSS REFERENCE TO RELATED APPLICATIONS

This application is the National Stage of PCT/ES2022/070099 filed on Feb. 24, 2022, which claims priority under 35 U.S.C. § 119 of Spanish Application No. U202130393 filed on Feb. 25, 2021, the disclosure of which is incorporated by reference. The international application under PCT article 21(2) was not published in English.

OBJECT OF THE INVENTION

The present invention relates to equipment which allows separating bagged waste, more specifically to equipment for separation which enables breaking the bag that contains the waste, classifying same by size, material, or colour, and subsequently shredding same, while at the same time allowing the waste deposited by a user in a container to be traced.

The object of the invention is to provide equipment for separating waste which allows reducing the carbon footprint associated with the process, as well as identifying the user and traceability of the waste for optimal subsequent management.

BACKGROUND OF THE INVENTION

Smart containers for collecting solid urban waste are known today. Some of these smart containers are for indoor use and receive waste one product at a time, while bagged waste pre-selected by the user is deposited in other containers. These containers have means for identifying the user who deposits the bagged waste in order to establish traceability of the waste and reward or penalize the user according to solid urban waste regulations.

However, this traceability is incomplete as it lacks a complementary system that further allows waste to be classified and identified according to its nature, for optimal subsequent treatment.

Moreover, bagged waste is transported to or treated in solid urban waste treatment plants in the form in which it is collected, i.e., bagged in the same way as when it was deposited by the user. This means that the transport of bagged waste is associated with high fuel consumption, since unprocessed bagged waste has a large amount of air.

Based on the foregoing, the applicant of the present utility model understands that there is a need to provide equipment for separating bagged waste which enables complete traceability of the waste, from the time it is deposited in the container to treatment in the solid urban waste plant or recycling plant, and further allows the waste to be shredded in nearby waste transfer plants or in the same waste transport vehicle, in order to reduce the amount of air therein, therefore reducing the carbon footprint associated with transport and management.

DESCRIPTION OF THE INVENTION

The disclosed equipment for separating bagged waste is intended for classifying and shredding waste deposited by a user, allowing the origin of the waste to be identified and ensuring its traceability, in order to verify the type of waste and thereby establish a subsequent bonus or fees to be returned to the user for correctly recycling the waste generated.

Likewise, another objective of the present invention is to promote the reduction of the volume of waste deposited at the collection point and thereby reducing the carbon footprint. In other words, waste shredding that is performed by means of the equipment of the present invention enables the subsequent transport of a smaller amount of air contained in the waste to be taken to the recycling plant, therefore reducing the carbon footprint associated with the process. Therefore, the equipment for separating bagged waste can be permanently located by way of a compact industrial plant or installed on a vehicle, allowing waste to be collected from different small population centres, classifying and shredding said waste, such that the equipment of the invention performs functions equivalent to the separation plants known today, which have large dimensions because they must serve several municipalities or large cities.

The configuration of the equipment for separating waste of the present invention has the following elements:
- at least one hopper with closing means,
- separation means for separating the bagged waste,
- at least one scanner for classifying the bagged waste and identifying the user from whom the bagged waste originates,
- at least one element for opening the bagged waste having cutting components to open the bags containing the waste,
- at least one video camera for inspecting the waste, which makes a recording of the stored waste after opening the bags and allows determining the bonus or fees to be returned to the user,
- at least one chute with gates for a first waste separation, wherein the gates control the guiding to the classification means, carrying out sorting,
- classification means for waste separation,
- at least one individual conveyance device for the individualized conveyance of each waste,
- at least one artificial vision camera for identifying the nature of each waste and enabling the homogeneous recycling thereof,
- at least one conveyor belt, and
- a plurality of shredders for shredding the waste separately taking into consideration the nature thereof. The inclusion of more than one shredder allows the waste classified by means of artificial vision by type of polymer and/or colour to be shredded separately, obtaining at the outlet of each shredder homogenous waste for subsequent "recirculation."

The equipment for separating waste of the present invention can be installed on a vehicle so as to make the equipment mobile or permanently installed in one location by way of an industrial plant. In any case, its compactness makes it suitable for waste management in an urban environment in order to minimize the volume of effective waste collected and to facilitate a more effective transport of concentrated and shredded waste, minimizing the carbon footprint generated during the transport thereof to recycling plants.

In that sense, both in the case in which the equipment for separating bagged waste is installed on a vehicle, such as a truck, or in the case in which it is installed in a nearby fixed separation plant, the bagged waste from an urban container, preferably a smart container which allows identifying the user who deposits the bagged waste therein, is received in the hopper. The closing means of the hopper allow closing the hopper while the truck moves, preventing the bagged waste from falling off accidentally as the truck moves and preventing foreign bodies from entering. Additionally, the closing means of the hopper allow preventing bagged waste theft, since situations of this type may arise in the case where the bagged waste has an economic value.

Advantageously, the separation means allow separating the bagged waste individually for the subsequent treatment thereof, as frequently some bags of waste are adhered to others.

Next, the already individually separated bagged waste passes through the scanner which allows classifying said waste and identifying the user who has deposited the bagged waste in the container. This is possible thanks to the fact that the bagged waste preferably has an RFID-type code, a barcode, a QR code, or the like, such that the scanner is an identifier for codes of this type.

Having identified the user, the bagged waste is then opened by means of the cutting components of the element for opening. Once waste is removed from the bags, it falls through the chute, where it is recorded by the video camera, and this allows linking the type of waste with the user. The chute has gates that allow performing a first separation of the waste to the classification means where waste sorting or separation is performed.

Then, the individual conveyance device allows the individualized conveyance of each waste, so that the artificial vision camera can identify the nature of each waste, allowing its subsequent homogeneous recycling. Specifically, the equipment of the invention can have between 1 and up to 20 artificial vision cameras which can be provided with artificial intelligence (AI). The number of artificial vision cameras and their properties will depend on the final size of the equipment for separating bagged waste, according to process needs.

After knowing the composition, shape, and colour of the waste, the conveyor belt conducts the waste to the plurality of shredders, allowing the shredding of each waste based on the nature thereof which, as mentioned above, optimizes its subsequent recycling.

DESCRIPTION OF THE DRAWINGS

To complement the description that will be made below and in order to help better understand the features of the present invention according to two preferred practical embodiments thereof, a non-limiting exemplary set of figures which depict the following is attached as an integral part of said description.

PREFERRED EMBODIMENT OF THE INVENTION

Figure 1:
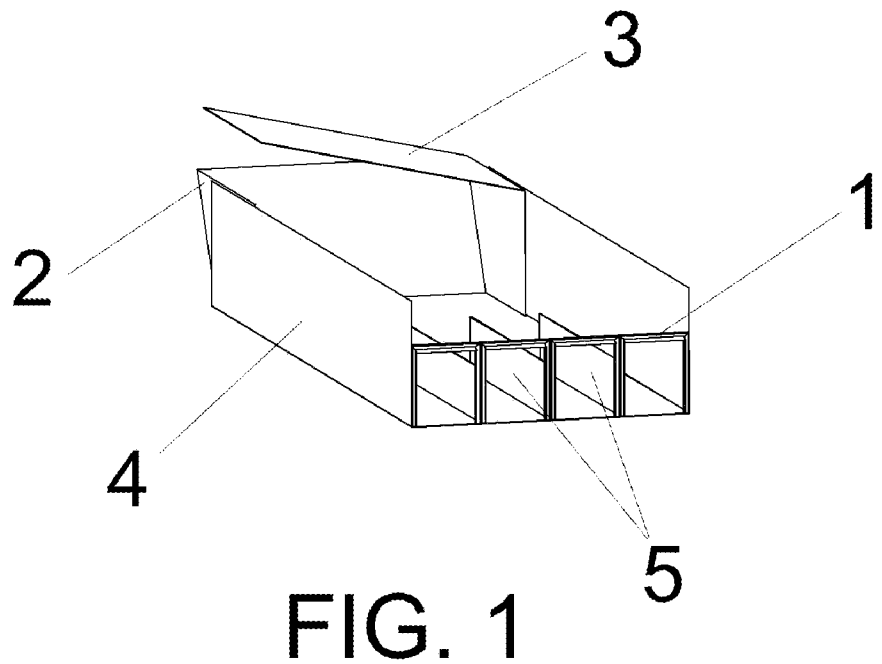
FIG. 1 shows a perspective view of the hopper with closing means and the separation means for separating the bagged waste, which are part of the equipment for separating bagged waste according to a first preferred embodiment of the invention.
Figure 3:
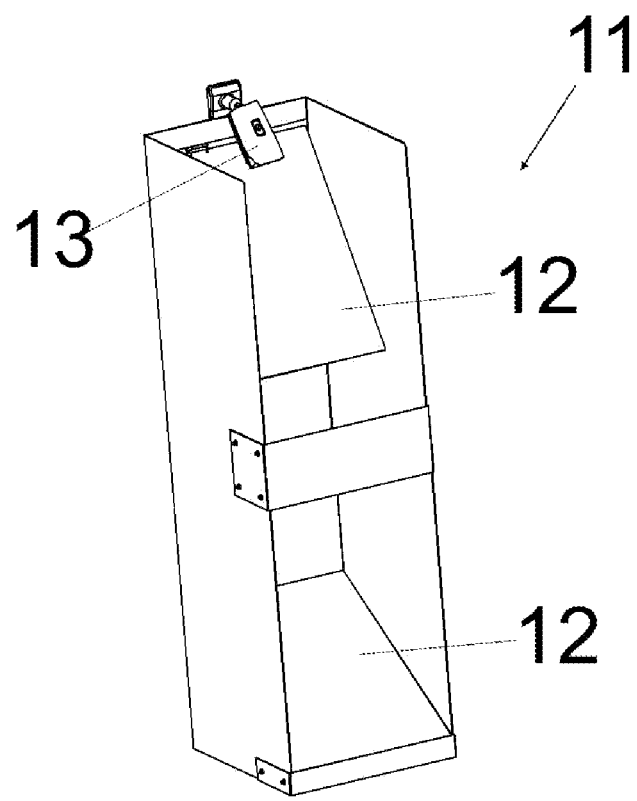
FIG. 3 shows a perspective view of the chute which is part of the equipment for separating bagged waste according to a first preferred embodiment of the invention.

In view of the mentioned figures accompanying the present invention, it can be observed that in a first preferred embodiment of the invention the equipment for separating bagged waste is formed by the following elements:
- a hopper (2) with closing means (3) and separation means for separating the bagged waste, which are depicted in FIG. 1. Preferably, the separation means are made up of a vibrating table (4), a guide rail (5), and/or a conveyor belt (which is not depicted in FIG. 1),
- a scanner (1) for classifying the bagged waste and identifying the user from whom the bagged waste originates, preferably made up of an identifier for RFID-type codes, barcodes, or QR codes,
- an element for opening the bagged waste (6) having cutting components,
- a video camera (13) for inspecting the waste, depicted in FIG. 3,
- a chute (11) with gates (12) for a first waste separation, as depicted in FIG. 3.

Figure 4:
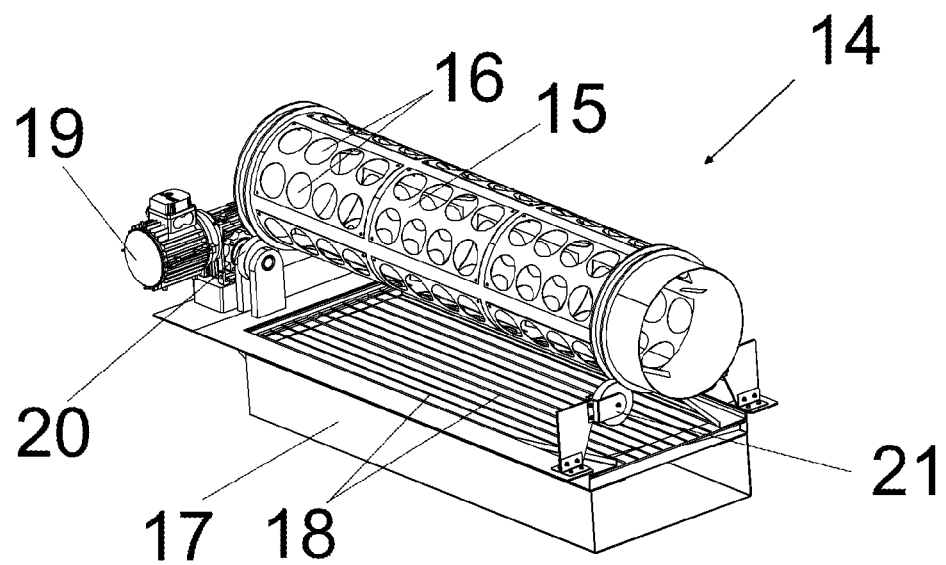
FIG. 4 shows a perspective view of the classification means which are part of the equipment for separating bagged waste according to a first preferred embodiment of the invention.
Figure 5:
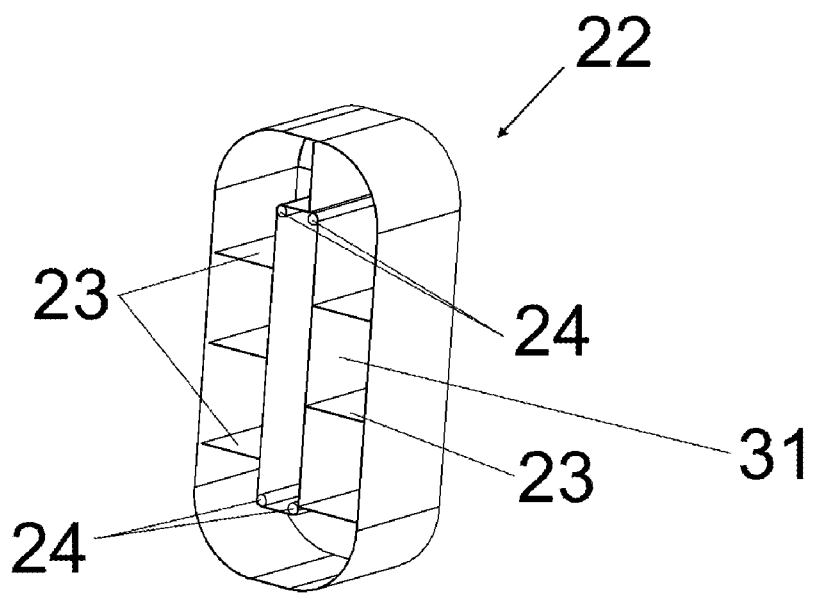
FIG. 5 shows a perspective view of the individual conveyance device formed as a rotating distributor which is part of the equipment for separating bagged waste according to a first preferred embodiment of the invention.
Figure 6:
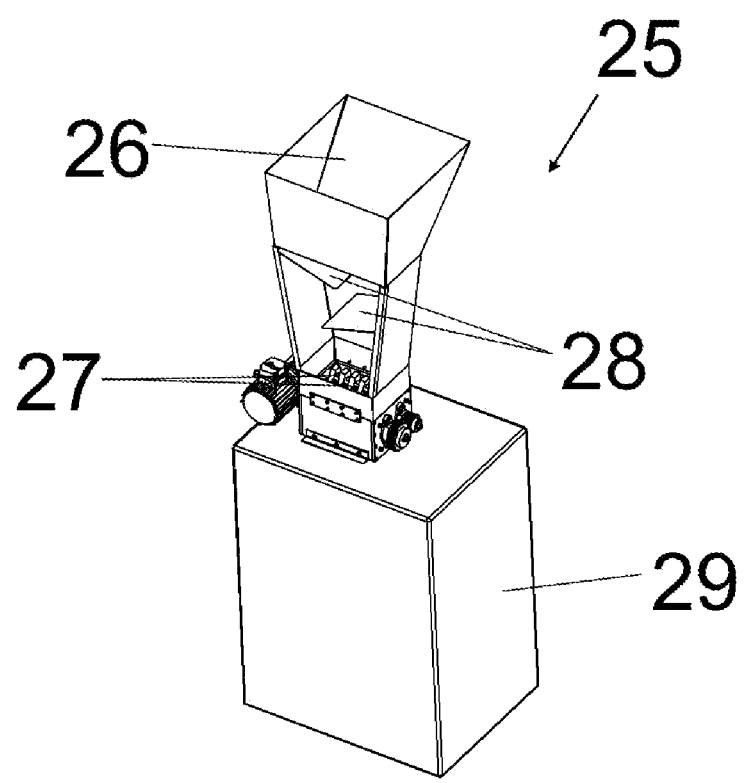
FIG. 6 shows a perspective view of one of the shredders which are part of the equipment for separating bagged waste according to a first preferred embodiment of the invention.

Optionally, the chute (11) can have stirrers or vanes to favour the mixing of the waste,
- classification means (14) for waste separation, as seen in FIG. 4,
- an individual conveyance device for the individualized conveyance of each waste, preferably made up of a rotating distributor (22), which is depicted in FIG. 5,
- an artificial vision camera for identifying the nature of each waste and the homogeneous recycling thereof, which is optionally provided with artificial intelligence (AI) for identifying the properties of the waste,
- a conveyor belt which may have a cover, and
- a plurality of shredders (25), as depicted in FIG. 6.

Figure 2:
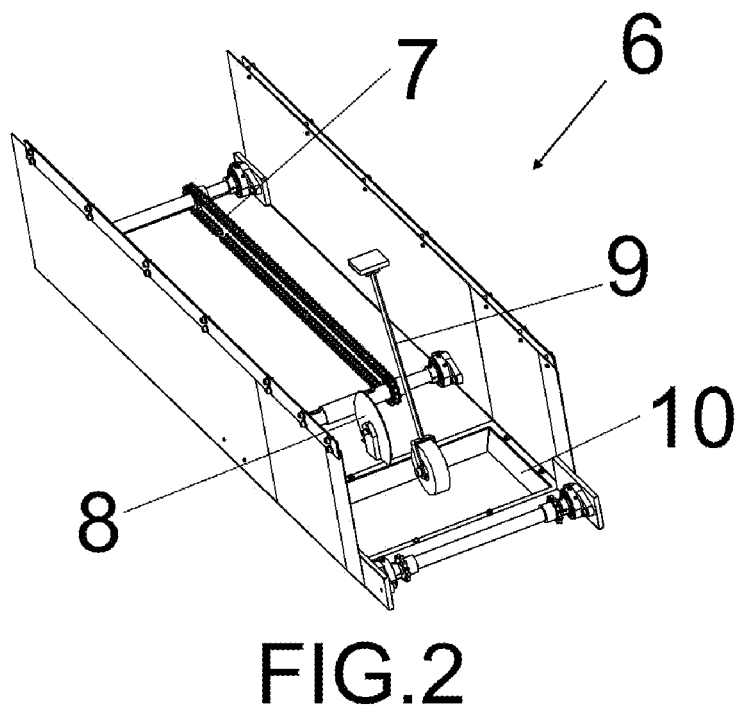
FIG. 2 shows a perspective view of the element for opening the bagged waste which is part of the equipment for separating bagged waste according to a first preferred embodiment of the invention.

The elements for opening the bagged waste (6) that are present in the equipment of the present invention can be formed as mechanical means or a robotic system, among other alternatives. Thus, FIG. 2 shows a first embodiment of the invention in which the element for opening the bagged waste (6) is made up of mechanical means, i.e., it is made up of chains (7) and fixed cutting elements (8) by way of cutting components to break the bag that contains the waste, complemented with a pusher (9) that leads the waste to a fall tray (10).

However, the element for opening the bagged waste (6) being made up of a robotic system, which includes a rotating blade and a manipulator robot associated with a system of chains with clamps, an embodiment that is not depicted in the figures of the present specification, is also an option of the embodiment of the present invention.

After opening the bagged waste, the inspection of said bagged waste is performed by means of video cameras (13). In the first preferred but non-limiting embodiment of the invention, the arrangement of the video cameras (13) in the chute (11), as seen in FIG. 3, in which a single video camera (13) has been depicted, is proposed.

From the chute (11), the waste passes to the classification means (14) for separation by sizes. The passage of the waste through the chute (11) is regulated by means of the gates (12) depicted in FIG. 3.

Moreover, in a preferred embodiment, the present invention proposes forming the classification means (14) as at least one multilevel vibrating table, which is formed by a plurality of vibrating tables (17) arranged in a line, wherein each vibrating table (17) has a plate with perforations or rods (18) separated from one another, defining a passage for classifying the waste.

In a complementary and optional manner, as depicted in FIG. 4, the classification means (14) have, associated with each of the vibrating tables (17) forming the multilevel vibrating table, a cylindrical rotating sieve (15), having perforations (16) and incorporating inner flanges for moving the waste forward along the inside thereof. In this way, the waste to be classified first goes through the cylindrical rotating sieve (15) which enables the sieving of the waste and then falls onto the vibrating table (17) by gravity. The cylindrical rotating sieve (15) is also known as a trommel and includes a transmission motor (19), a drive wheel (20), and a support wheel (21), elements which complement the cylindrical rotating sieve (15) in order to provide continuous rotating movement.

Likewise, the cylindrical rotating sieve (15) making up the classification means (14) optionally has perforations (16) of at least three different diameters to ensure the classification of the waste by size.

In an alternative embodiment not depicted in the figures accompanying the present specification, the classification means (14) are made up of a first cylindrical rotating sieve and a second concentrically arranged cylindrical rotating sieve, with the diameter of the first cylindrical rotating sieve being smaller than the diameter of the second cylindrical rotating sieve, wherein both cylindrical rotating sieves have perforations, with the perforations of the first cylindrical rotating sieve being of a larger diameter than the perforations of the second cylindrical rotating sieve, and wherein both cylindrical sieves incorporate inner flanges for moving the waste forward along the inside thereof. Thus, the inclusion of the concentric cylindrical rotating sieves would replace the other options described in detail above for the classification means (14), the function thereof being the same.

After classifying the waste, it passes to an individual conveyance device which can be made up of a robotic arm, a conveyor belt, a rotating distributor (22), and/or a revolving belt. In the preferred embodiment depicted in FIG. 5, the individual conveyance device is made up of a rotating distributor (22) formed by a closed belt (31), pushing paddles (23), and belt guiding rollers (24) which facilitate the movement of the waste.

The waste is conveyed from the outlet of the rotating distributor (22) through a conveyor belt to the shredders (25). Before reaching the shredders (25), the waste passes through artificial vision cameras, preferably provided with AI, and can optionally be combined with other visual inspection technologies, such as a scanning device, a refraction device, or a birefringence device, such that the properties of the waste can be identified when it moves on the conveyor belt.

In this way, the conveyor belt has gates for the sorted entry of the waste into each shredder (25) according to the information determined by the artificial vision cameras.

Thus, it is achieved that the waste to be shredded by each shredder (25) has the same nature and/or colour, or natures readily separable for recirculation.

As seen in FIG. 6, each shredder (25) is formed by a receiving funnel (26) where there are arranged shafts with blades (27), directing flanges (28), and a container (29) for storing the shredded waste.

The presence of the shredders (25) minimizes the volume of waste to be transported, preventing the transport of air, which reduces carbon footprint. Advantageously, the inclusion of a plurality of shredders (25) allows shredding the waste after the classification thereof by type of polymer and colour, thanks to the artificial vision camera.

Figure 7:
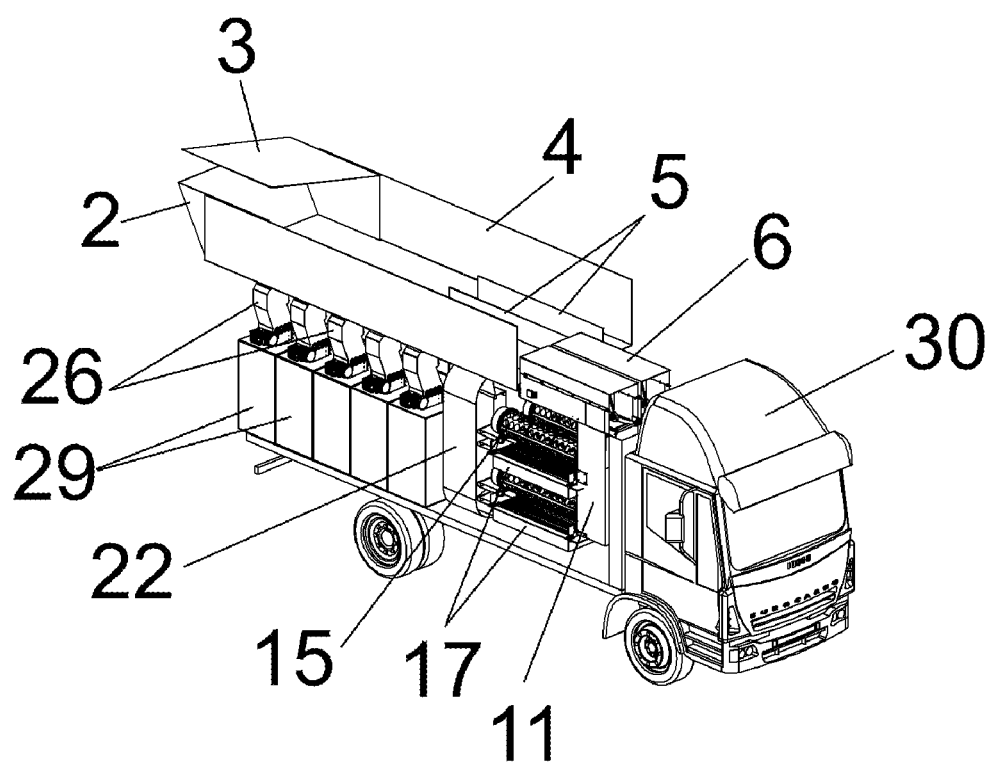
FIG. 7 shows a perspective view of a vehicle having the equipment for separating bagged waste according to a first preferred embodiment of the invention.

Lastly, in a first preferred but non-limiting embodiment of the invention depicted in FIG. 7, the equipment for separating waste is installed on a vehicle (30) so as to make the equipment mobile.

Specifically, FIG. 7 depicts the vehicle (30) having the first preferred embodiment of the equipment for separating bagged waste of the invention, in which the following can be seen:

the hopper (2) with closing means (3), a vibrating table (4), a guide rail (5) forming the separation means for separating the bagged waste, the element for opening the bagged waste (6), the chute (11), two vibrating tables (17) together with two cylindrical rotating sieves (15) arranged vertically in a line or in a multilevel manner, located adjacent to another line of vibrating tables (17) associated with the cylindrical rotating sieves (15) forming the classification means (14) for separating waste.

the individual conveyance device made up of a rotating distributor (22) and a conveyor belt (not depicted in the figures accompanying the present specification), a plurality of shredders (25) with their receiving funnels (26) and containers (29) for storing shredded waste.

As seen in FIG. 7, the classification means (14) being arranged in a line or in a multilevel manner is highly advantageous as they enable increasing waste treatment capacity.

Figure 8:
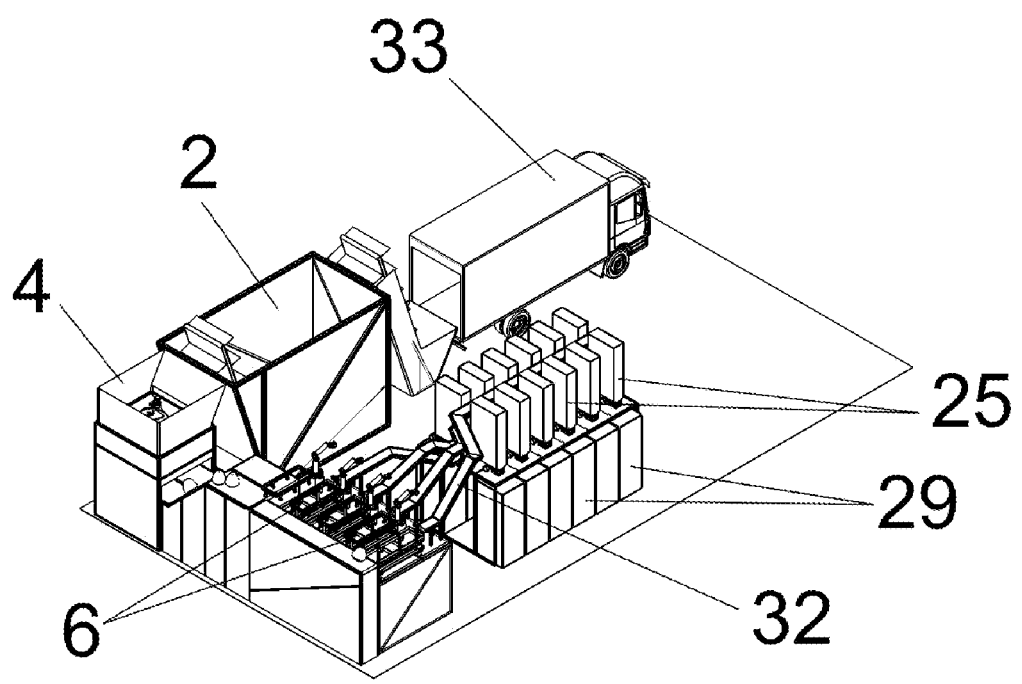
FIG. 8 shows a perspective view of the equipment for separating bagged waste according to a second preferred embodiment of the invention, which is permanently installed in one location by way of an industrial plant.

Lastly, as depicted in FIG. 8, in a second preferred embodiment of the invention the equipment for separating bagged waste can optionally be installed permanently in one location by way of an industrial plant.

Specifically, FIG. 8 shows that a waste collection truck (33), of the types traditionally known, reaches the industrial plant formed by the equipment for separating bagged waste.

The bagged waste is deposited in the hopper (2), passing subsequently to a vibrating table (4) which forms the separation means. The industrial plant includes a scanner (1) (not depicted in FIG. 8) for classifying the bagged waste and identifying the user who has deposited same. Then, the bagged waste passes through elements for opening the bagged waste (6) through a chute and classification means, which can be robotic classification means (not depicted in FIG. 8). It should be highlighted that video camera for inspecting the waste (no depicted in FIG. 8) is installed in this path.

The waste then passes through an individual conveyance device (32), going through an artificial vision camera, and a conveyor belt to the shredders (25) having containers (29) for storing shredded waste.

The invention claimed is:

1. Equipment for separating bagged waste, comprising:
   at least one hopper (2) with closing means (3),
   separation means configured for separating the bagged waste,
   at least one scanner (1) configured for classifying the bagged waste and identifying the user from whom the bagged waste originates,
   at least one element configured for opening the bagged waste (6), the at least one element having cutting components,
   at least one video camera (13) configured for inspecting the waste,
   at least one chute (11) with gates (12) configured for a first waste separation,
   classification means (14) configured for waste separation,
   at least one individual conveyance device,
   at least one artificial vision camera configured for identifying the nature of each waste and the homogeneous recycling thereof,
   at least one conveyor belt, and
   a plurality of shredders (25),
      wherein the element configured for opening the bagged waste (6) comprises chains (7) with fixed cutting elements (8).

2. The equipment for separating bagged waste according to claim 1, wherein the separation means comprises a vibrating table (4), a guide rail (5), and/or a conveyor belt.

3. The equipment for separating bagged waste according to claim 1, wherein the scanner (1) is an identifier for RFID-type codes, barcodes, or QR codes.

4. Equipment for separating bagged waste, comprising:
   at least one hopper (2) with closing means (3),
   separation means configured for separating the bagged waste,
   at least one scanner (1) configured for classifying the bagged waste and identifying the user from whom the bagged waste originates,
   at least one element configured for opening the bagged waste (6), the at least one element having cutting components,
   at least one video camera (13) configured for inspecting the waste,
   at least one chute (11) with gates (12) configured for a first waste separation,
   classification means (14) configured for waste separation,
   at least one individual conveyance device,
   at least one artificial vision camera configured for identifying the nature of each waste and the homogeneous recycling thereof,
   at least one conveyor belt, and
   a plurality of shredders (25),
      wherein the classification means (14) comprise at least one multilevel vibrating table, which is formed by a plurality of vibrating tables (17) arranged in a line, wherein each vibrating table (17) has a plate with perforations or rods (18) separated from one another, defining a passage for classifying the waste.

5. The equipment for separating bagged waste according to claim 4, wherein the element configured for opening the bagged waste (6) is made up of a rotating blade and a manipulator robot associated with a system of chains with clamps.

6. The equipment for separating bagged waste according to claim 1, wherein the chute (11) has stirrers.

7. The equipment for separating bagged waste according to claim 4, wherein the element configured for opening the bagged waste (6) comprises chains (7) with fixed cutting elements (8).

8. The equipment for separating bagged waste according to claim 4, wherein the classification means (14) have a cylindrical rotating sieve (15), having perforations (16) and incorporating inner flanges for moving the waste forward along the inside thereof.

9. The equipment for separating bagged waste according to claim 8, wherein the perforations (16) of the cylindrical rotating sieve (15) have at least three different diameters.

10. Equipment for separating bagged waste, comprising:
    at least one hopper (2) with closing means (3),
    separation means configured for separating the bagged waste,
    at least one scanner (1) configured for classifying the bagged waste and identifying the user from whom the bagged waste originates,
    at least one element configured for opening the bagged waste (6), the at least one element having cutting components,
    at least one video camera (13) configured for inspecting the waste,
    at least one chute (11) with gates (12) configured for a first waste separation,
    classification means (14) configured for waste separation,
    at least one individual conveyance device,
    at least one artificial vision camera configured for identifying the nature of each waste and homogeneous recycling thereof,
    at least one conveyor belt, and
    a plurality of shredders (25),
       wherein the classification means (14) comprise a first cylindrical rotating sieve and a second concentrically arranged cylindrical rotating sieve, with a diameter of the first cylindrical rotating sieve being smaller than a diameter of the second cylindrical rotating sieve, wherein both cylindrical rotating sieves have perforations, with the perforations of the first cylindrical rotating sieve being of a larger diameter than the perforations of the second cylindrical rotating sieve, and wherein both cylindrical rotating sieves incorporate inner flanges for moving the waste forward along the inside thereof.

11. The equipment for separating bagged waste according to claim 1, wherein the individual conveyance device comprises a robotic arm, a conveyor belt, a rotating distributor (22), and/or a revolving belt.

12. The equipment for separating bagged waste according to claim 1, wherein the artificial vision camera is combined with a scanning device, a refraction device, or a birefringence device.

13. The equipment for separating bagged waste according to claim 1, wherein the conveyor belt has a cover.

14. The equipment for separating bagged waste according to claim 1, wherein each shredder (25) is formed by a receiving funnel (26) where shafts with blades (27) are arranged.

15. The equipment for separating bagged waste according to claim 1, wherein the equipment is installed on a vehicle (30) so as to make the equipment mobile.

16. The equipment for separating bagged waste according to claim 1, wherein the equipment is permanently installed in one location by way of an industrial plant.

17. The equipment for separating bagged waste according to claim 10, wherein the element configured for opening the bagged waste (6) comprises chains (7) with fixed cutting elements (8).

18. The equipment for separating bagged waste according to claim 10, wherein the element configured for opening the bagged waste (6) is made up of a rotating blade and a manipulator robot associated with a system of chains with clamps.

* * * * *